United States Patent
Nakagawa

(10) Patent No.: US 8,493,584 B2
(45) Date of Patent: Jul. 23, 2013

(54) INFORMATION PROCESSING APPARATUS FOR PERFORMING PRINTING AND DETERMINING WHETHER A CONFLICT RESOLUTION OF THE SETTING VALUES IN A COMPLEX PRINT SETTING IS REQUIRED

(75) Inventor: Masashi Nakagawa, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 12/486,634

(22) Filed: Jun. 17, 2009

(65) Prior Publication Data
US 2009/0316180 A1   Dec. 24, 2009

(30) Foreign Application Priority Data
Jun. 20, 2008   (JP) .................................. 2008-162313

(51) Int. Cl.
*G06K 15/02*   (2006.01)
(52) U.S. Cl.
USPC ........................ 358/1.14; 358/1.13; 358/1.15
(58) Field of Classification Search
USPC ...................... 358/1.14, 1.13, 1.15
See application file for complete search history.

(56) References Cited

U.S. PATENT DOCUMENTS

| 4,873,643 A | 10/1989 | Powell et al. | |
| 2002/0067491 A1 | 6/2002 | Minagawa | |
| 2006/0221372 A1 * | 10/2006 | Onishi et al. | 358/1.13 |
| 2007/0216925 A1 * | 9/2007 | Nakamura | 358/1.13 |

FOREIGN PATENT DOCUMENTS

| JP | 2002-175164 A | 6/2002 |
| JP | 2002-287924 A | 10/2002 |
| JP | 2004-38296 * | 2/2004 |

OTHER PUBLICATIONS

Machine translation for JP2004-38296.*

* cited by examiner

*Primary Examiner* — Qian Yang
(74) *Attorney, Agent, or Firm* — Canon USA Inc. IP Division

(57) ABSTRACT

An information processing apparatus configured to transmit print data to a printing apparatus to perform printing includes a determination unit configured to determine whether a selected complex print setting including a plurality of setting values requires resolution of a conflict of setting values, and an execution unit configured to execute print processing using the setting values without performing conflict resolution of the setting values, if the determination unit determines that the complex setting does not require the conflict resolution of the setting values, and execute print processing using the setting values that have undergone the conflict resolution of the setting values, if the determination unit determines that the complex setting requires the conflict resolution of the setting values.

5 Claims, 16 Drawing Sheets

INFORMATION PROCESSING APPARATUS FOR PERFORMING PRINTING AND DETERMINING WHETHER A CONFLICT RESOLUTION OF THE SETTING VALUES IN A COMPLEX PRINT SETTING IS REQUIRED

BACKGROUND OF THE INVENTION

1. Field of the Invention

The present invention relates to an image forming apparatus, an information processing apparatus configured to communicate with the image forming apparatus, a printing system including such apparatuses, and a control program for controlling the apparatuses, and a control method.

2. Description of the Related Art

In printing a document or a drawing generated by an information processing apparatus such as a personal computer, an application gives a print instruction to the printer. According to the instruction, print settings such as paper size, paper orientation, page layout, print method, color mode, and stamp setting are made via a user interface (UI) of a printer driver that is supported by the printer. Then, based on the print setting information, document data is converted by the printer driver into data in a data format that can be interpreted by the printer, and the converted data is transmitted to the printer and printed.

Further, if a user selects a specific printer in printing generated document data using a certain application, the application selects a printer driver that is supported by the printer. If the user makes detailed settings, the user starts a UI of the printer driver and makes the setting of each item. When all the print settings are completed, the application or the printer driver gives a print instruction to the printer. Such a system is intended for an information processing apparatus (OS) that allows common use of the printing system based on each application. After the OS selects the printer, the OS needs to start the UI of the printer driver that is supported by the selected printer.

Nowadays, the printer apparatus itself has various functions. Accordingly, a number of function settings that the UI of the printer driver needs to make is increasing. If the number of functions is increased, while various functions can be provided to the user, setting procedures become complicated.

In order to reduce the complexity of the above-described setting method, two methods are provided. Firstly, according to a technique of a printing system discussed in Japanese Patent Application Laid-Open No. 2002-287924, a print setting made by a user is represented by a printer icon and registered. This technique allows registration of multiple printer icons for each print setting. Thus, the user can select a printer icon that is appropriate for the printing. With this technique, a process for opening the UI of the printer driver can be avoided when the user makes the detailed setting.

Secondly, according to a technique discussed in Japanese Patent Application Laid-Open No. 2002-175164, a print setting made by a user using a UI of a printer driver is saved and registered as one item by the printer driver. The user starts the UI of the printer driver at the time of printing and selects an item that is appropriate for the purpose of the printing. In this way, although the user needs to start the UI of the printer driver, the user may select only the registered print setting and does not need to make detailed settings. Thus, usability is improved.

The printer driver examines whether print settings made by the user or the application (OS) are correct and also determines whether the settings are valid among each function. The former processing may be referred to as inspection processing of print setting while the latter may be referred to as conflict resolution processing.

If the number of items to be set regarding the printer driver is increased, an amount of information about the print setting is also increased, and the processing of inspection and conflict resolution becomes complicated. As a result, time necessary in processing the driver will be increased.

SUMMARY OF THE INVENTION

The present invention is directed to an information processing apparatus, an information processing method, and a storage medium storing a control program.

According to an aspect of the present invention, an information processing apparatus configured to transmit print data to a printing apparatus to perform printing includes a determination unit configured to determine whether a selected complex print setting including a plurality of setting values requires resolution of a conflict of setting values, and an execution unit configured to execute print processing using the setting values without performing the conflict resolution of the setting values, if the determination unit determines that the complex setting does not require the conflict resolution of the setting values, and execute print processing using the setting values that have undergone the conflict resolution of the setting values, if the determination unit determines that the complex setting requires the conflict resolution of the setting values.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
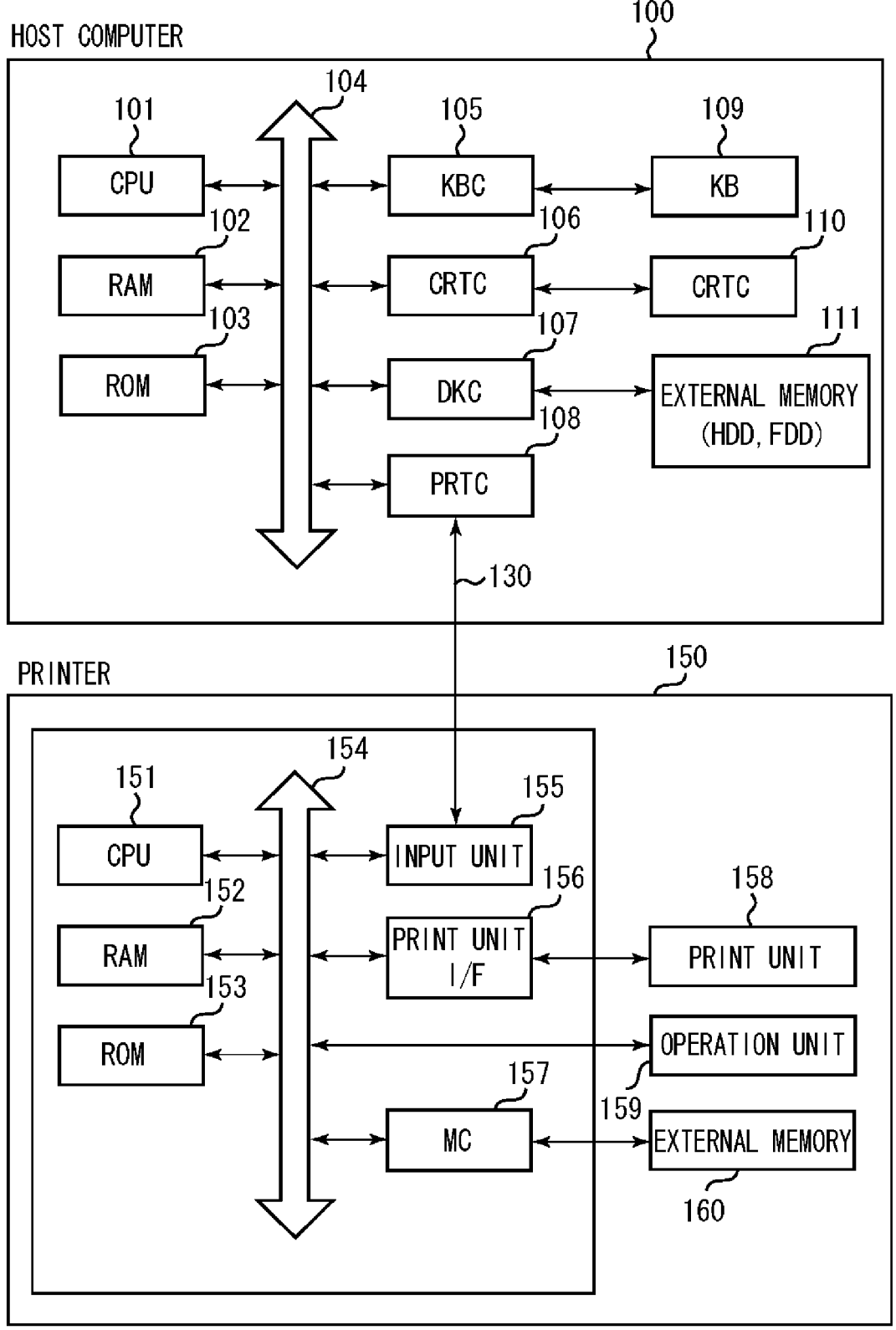
FIG. 1 illustrates a configuration of a printing system according to an embodiment of the present invention.

FIG. 1 illustrates a configuration of a printing system according to the present embodiment.

In FIG. 1, a host computer 100 includes a central processing unit (CPU) 101. The CPU 101 processes a document that contains, for example, graphic data, an image, a text, and a table (including table calculation) based on a document processing program stored in an external memory 111. Further, the CPU 101 has control over each device connected to a system bus 104. An operating system program (hereinafter referred to as an OS) serving as a control program of the CPU 101 is stored in the external memory 111. A random access memory (RAM) 102 functions as a main memory and a work area of the CPU 101.

A keyboard controller (KBC) 105 controls key input made via a keyboard 109 or a pointing device (not shown). A CRT controller (CRTC) 106 controls display of a CRT display (CRT) 110. A disk controller (DKC) 107 controls access to the external memory 111 such as a hard disk drive (HDD) or a flexible disk (FDD).

A boot program, various applications, font data, a user file, an editing file, a printer control command generation program (hereinafter referred to as a printer driver) are stored in the external memory 111. A printer controller (PRTC) 108 is connected to a printer 150 via a bidirectional interface 130 and controls communication with the printer 150.

The CPU 101 rasterizes an outline font on a display information RAM in the RAM 102 so that WYSIWYG (what you see is what you get) is realized on the CRT 110. Further, the CPU 101 opens on the CRT 110 various registered windows based on a command selected by a mouse cursor and executes various types of data processing. When the user executes printing, the user opens the window concerning setting of the printing to set a print processing method using the printer driver including setting of the printer and selecting of the print mode.

The printer 150 is controlled by a CPU 151. The CPU 151 outputs an image signal as output information to a print unit (printer engine) 158 connected to a system bus 154 based on a control program stored in a read-only memory (ROM) 153 or a control program stored in an external memory 160. Further, a control program of the CPU 151 is stored in the ROM 153. Font data used in generating the above-described output information is stored in a font ROM of the ROM 153. If the printer does not have the external memory 160 such as a hard disk, then information used by the host computer is stored in a data ROM of the ROM 153.

The CPU 151 can communicate with the host computer 100 via an input unit 155 and can send information within the printer 150 to the host computer 100. A RAM 152 is a RAM that functions as a main memory or a work area of the CPU 151. The RAM 152 is configured such that the memory capacity can be expanded by an option ROM connected to an expansion port (not shown). The RAM 152 is used for an output information rasterizing area, an environment data storing area, or for a non-volatile RAM (NVRAM).

Access to the external memory 160 such as a hard disk drive or an IC card is controlled by a memory controller (MC) 157. The external memory 160 can be connected to the MC 157 as an option. Font data, emulation program, and form data can be stored in the external memory 160. An operation unit 159 is a panel on which a switch and a LED display for operation are arranged.

Figure 2:
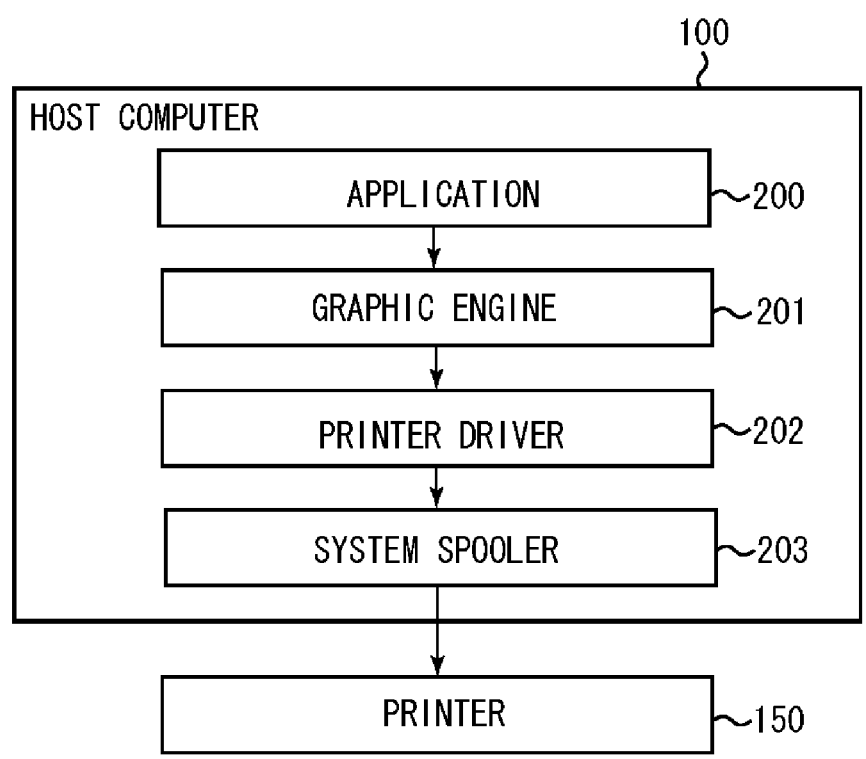
FIG. 2 illustrates a software configuration of printing system with respect to print processing according to the embodiment of the present invention.

FIG. 2 illustrates a software configuration for print processing in the printing system according to the present exemplary embodiment.

An application 200, a graphic engine 201, a printer driver 202, and a system spooler 203 are program modules stored in the external memory 111 of the host computer 100. According to an instruction from the OS or a program that uses such program modules, they are loaded to the RAM 102 and executed by the CPU 101. Further, the application 200 and the printer driver 202 can be added to or installed in a FDD of the external memory 111, a CD-ROM (not shown), or a HDD as the external memory 111 via a network.

The application 200 stored in the external memory 111 is loaded to the RAM 102 and executed. When printing is performed by the printer 150 according to an instruction from the application 200, the graphic engine 201 which is similarly loaded to the RAM 102 is executed to make an output (drawing).

The graphic engine 201 similarly loads the printer driver 202 prepared for the printer 150 from the external memory 111 to the RAM 102, and sets output of the application 200 to the printer driver 202. According to Microsoft® Windows®, which is an OS of Microsoft Corporation, an American-based corporation, the graphic engine 201 corresponds to a device interface of the OS called a graphic device interface (GDI). Further, the GDI function received from the application 200 is converted into a device driver interface (DDI) function, and the obtained DDI function is output to the printer driver 202.

Next, the printer driver 202 converts the DDI function received from the graphic engine 201 into a control command that is, for example, page description language (PDL), which can be recognized by the printer. The obtained printer control command is output to the printer 150 as print data via the system spooler 203 loaded to the RAM 102 by the OS and via the bidirectional interface 130. A print setting (XML format) corresponding to a printer icon (duplicated) described below according to the present embodiment is input by the printer driver 202 and reflected in the PDL, which's sent to the printer 150. The print setting may be interpreted by the printer driver in the XML format. The print setting can be sent to the printer 150 in the XML format.

According to the present invention, the conflict resolution processing may be simply referred to as conflict processing. The inspection processing and the conflict processing are performed in the printer 150.

Figure 3:
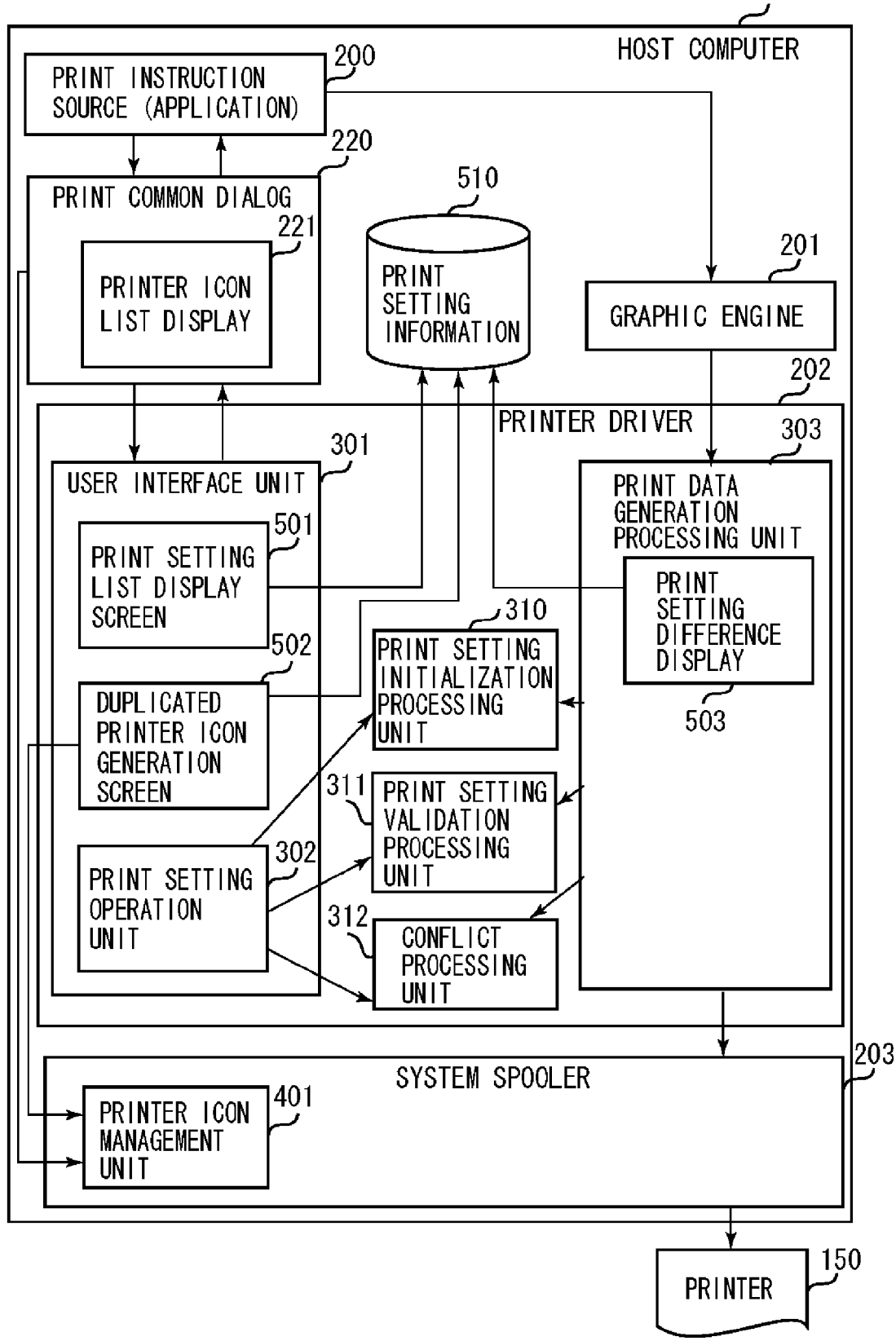
FIG. 3 illustrates a relation between an application and a printer driver and a configuration of internal processing of the printer driver of the printing system according to the embodiment of the present invention.

FIG. 3 illustrates a relation between an application and a printer driver in the printing system and a configuration of internal processing of the printer driver according to the embodiment of the present invention.

A printing system named "XPS printing system" is provided in Windows Vista™ of Microsoft Corporation. According to the XPS printing system, the print setting information which has been so far handled and stored in binary data using a structure named DEVMODE can be handled in XML format data named "PrintTicket". Generally, read and write processing of data in XML format takes longer compared to the processing in binary format. Thus, processing time required for print setting including verification and conflict processing tends to increase.

Since print setting information can be changed according to the techniques discussed in both of the above-described Japanese Patent Applications Laid-Open No. 2002-287924 and 2002-175164, the print setting may be changed by the user after it is registered. Particularly, if the user inadvertently changes the print setting without noticing it due to some operation error, the registered information may also be changed.

Further, since the techniques discussed in the above-described Japanese Patent Applications Laid-Open No. 2002-287924 and 2002-175164 allow changes in print setting, inspection and conflict processing are to be consistently executed. The inspection and conflict processing of the printer driver supported by the multi-function printers and digital MFPs in recent years has become complicated due to the increased number of print setting items. Although similar processing has been performed by the conventional GDI driver, the data used in describing the print setting of the GDI driver has been based on a binary format of the DEVMODE structure.

However, since PrintTicket processes data in XML text format, the processing takes time compared to the DEVMODE structure and the processing time is increased to a significant level.

The printer driver needs to perform the inspection and the conflict processing of the print setting that can be changed, each time the print setting is used, for example, at the time of UI display or at the time of printing. Thus, time necessary in displaying the UI and the time lapsed before the printing is started are affected by the above processing.

The application 200, a print common dialog 220, the graphic engine 201, the printer driver 202, the system spooler 203, and print setting information 510 are stored in the external memory 111 of the host computer 100. Further, the printer driver includes a user interface unit 301, a print data generation unit 303, a print setting initialization unit 310, a print setting inspection unit 311, and a conflict processing unit 312.

Figure 15:
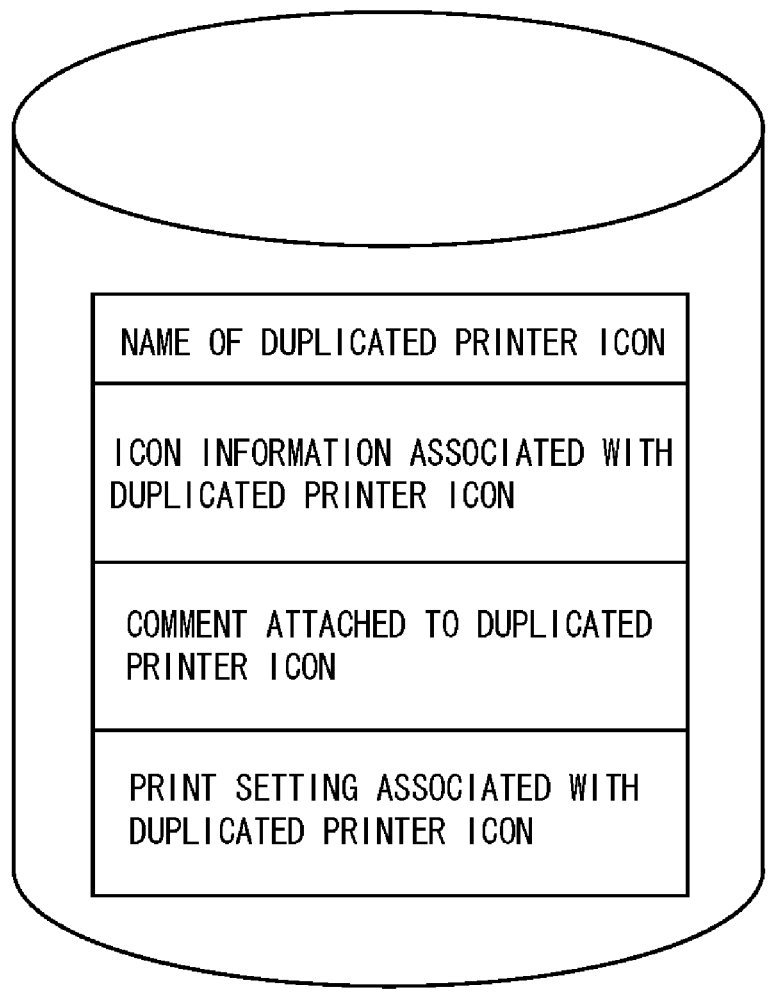
FIG. 15 illustrates information that is associated with the duplicated printer icon stored in the storage medium according to the embodiment of the present invention.

The user interface unit 301 includes a feature that enables display of a print item setting screen 303, a print setting list display screen 501, and a duplicated printer icon generation screen 502. Further, a feature for displaying print setting difference display screen is stored in the print data generation processing unit 303. As illustrated in FIG. 15, the print setting information 510 includes information about a print setting, a name, an icon, and a comment, all of which are associated with each duplicated printer icon. The system spooler 203 includes a function 401 used for managing registration and deletion of the printer icon.

The print common dialog 220 is a system provided by the OS so that the application 200 can versatilely perform printing. Using the print common dialog 220, the application 200 selects a printer to be used and obtain information about the printer. A printer icon list display function, which is one function of a print common dialog is a function for acquiring a list of printer icons that are currently registered, from the above-described icon management unit and displaying the list. The print common dialog 220 may be included in the user interface unit 301.

First, a generation procedure of a printer icon that is associated with a specific print setting of the printing system according to the present embodiment will be described based on an operation flow illustrated in FIG. 4. As an example of a print setting operation unit 302, a print setting screen 1000 illustrated in FIG. 5 will be used.

In step S101, the printer driver (a print setting operation unit 302) detects that the user has selected an add (generation) button of a printer icon. In step S102, the print setting operation unit 302 internally stores the currently-set print settings and displays a duplicated printer icon generation screen 1010. The print settings that are internally stored include a paper size 1001, a paper orientation 1002, a page layout 1003, a printing method 1004, a color mode 1005, and a stamp 1006. When the add button is selected, according to this screen, in step S107, the duplication printer icon generation processing unit 502 duplicates the printer icon using a name entered in a name field 1011, an icon selected from the icon field 1012, and a comment entered in a comment field 1013.

It is favorable if necessary conflict evaluation processing and conflict resolution processing are performed in step S107. For example, if a combination of bookbinding and two-sided is set as a setting value, conflict resolution can be realized based on a predetermined rule, for example, by setting the bookbinding "ON" and two-sided "OFF". If a combination of bookbinding and OHP is set as a setting value, conflict resolution can be realized, for example, by setting the OHP "ON" and bookbinding "OFF".

Further, if a two-sided setting and other settings are included in the setting of favorites corresponding to the printer icon, then the print setting operation unit 302 acquires option information of the printer by communicating with the printer. If the information indicates that the printer does not support two-sided printing, then, conflict resolution can be realized by setting a value of the two-sided included in the favorites setting, to "OFF". This processing may be simply referred to as conflict (resolution) processing in describing the embodiment below.

In this way, by using the prior rule is used, or the user can register the conflict-resolved setting value as a duplicated printer icon.

Further, the printer icon generation processing unit 502 stores the print setting that is internally stored in the print setting information storage area in association with the duplicated print icon.

If a cancel button 1015 is selected using a printer icon add screen 1010 (NO in step S106), then the printer driver ends the process without duplicating the printer icon and storing the print setting.

According to the present embodiment, in duplicating the printer icon, first, the printer icon is registered through printer registration processing which is one function of the printer icon management unit 401 of the system spooler 203. Then, after the registration of the printer icon is completed, the information associated with the duplicated printer driver icon is stored in the print setting information 510.

The printer driver 202 examines whether the currently-selected printer icon is the above-described duplicated icon before the UI is displayed or printing is performed. As one method, it is determined whether a same name is included in the print setting information 510 associated with the duplicated printer icon. In the present embodiment, it is determined whether the printer icon is a duplicated printer icon according to the above determination process. However, the determination is not limited to such a method.

Figure 7:
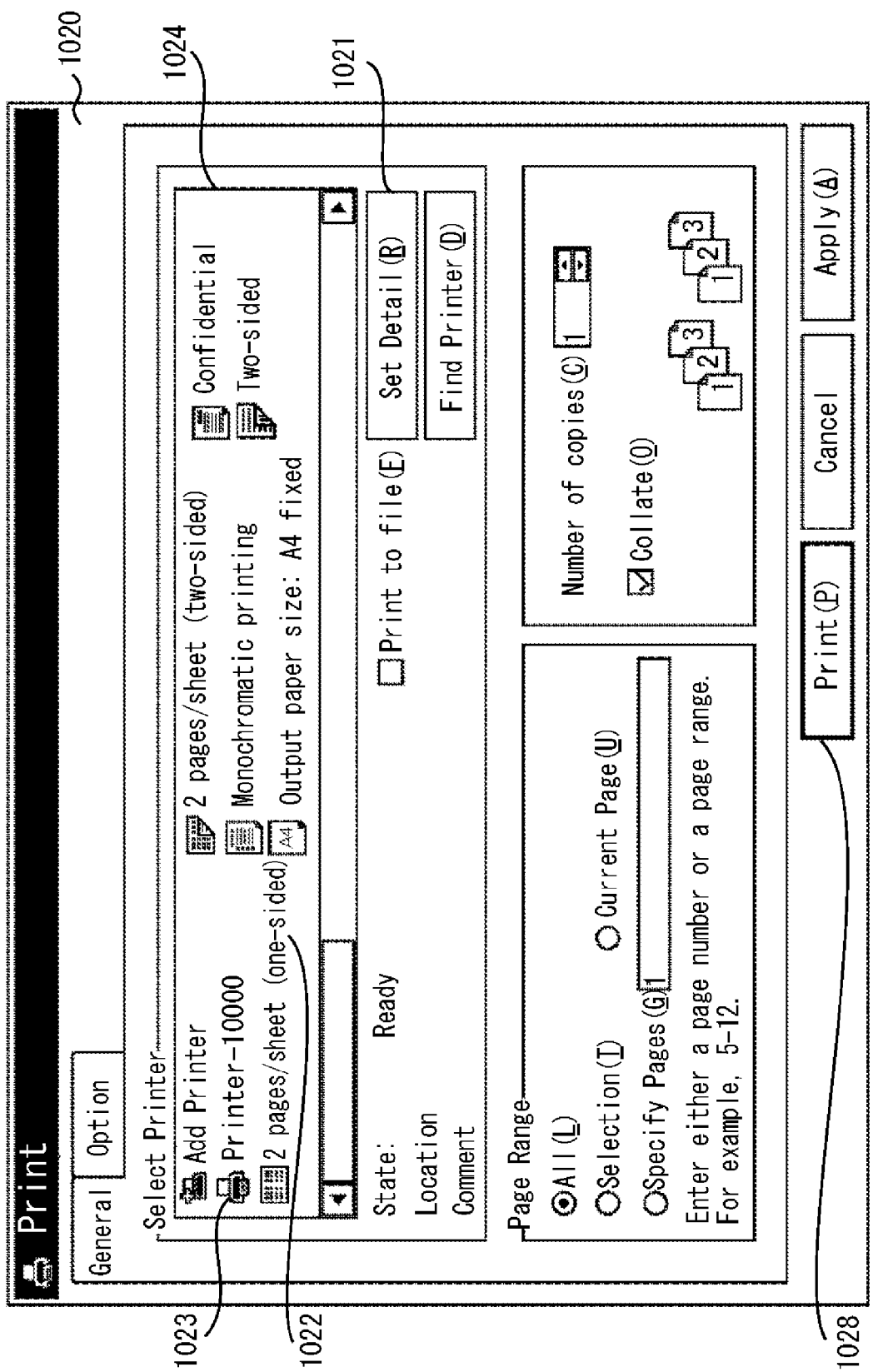
FIG. 7 illustrates a display example of the duplicated printer icon of the printing system according to the embodiment of the present invention.

Now, it will be described how the duplicated printer icon is actually referred to and selected according to the printing system of the present embodiment. FIG. 7 illustrates a display example of the duplicated printer icon using a print common dialog provided by Microsoft Windows. Normally, this dialog is started in response to a print instruction given from the application 200.

The name entered in the name field 1011 is shown in a print name list field 1022 and the icon selected from the icon field 1012 is shown in the icon 1023. Since the user can simply select the printer icon from the items, the user can easily and surely execute printing that suits the user's needs. In other words, a plurality of values concerning print destination and print setting are associated with each of the printer icons displayed in a field 1024 in FIG. 7, and the user can easily set the print setting and the print destination by selecting one from the printer icons.

Figure 4:
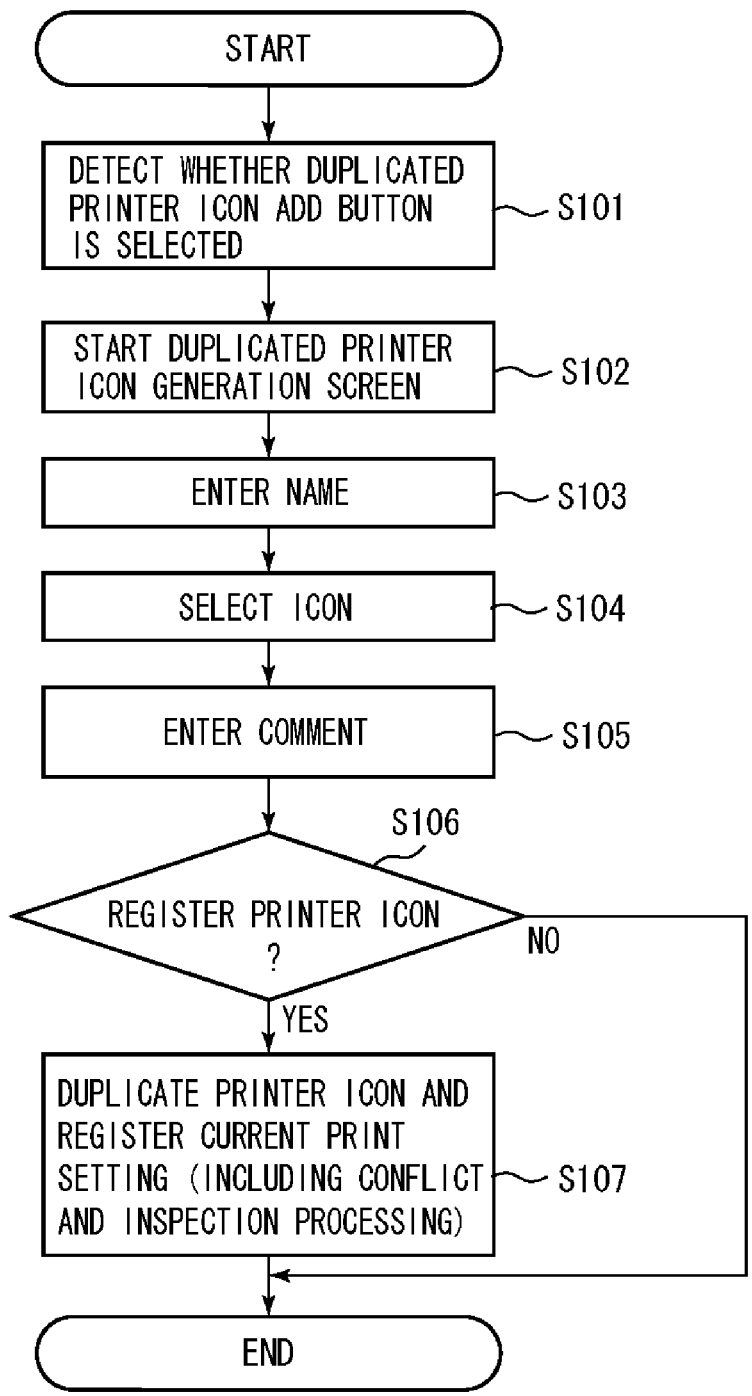
FIG. 4 is a flowchart illustrating processes of generating a duplicated printer icon which is associated with a specific print setting of the printing system according to the embodiment of the present invention.
Figure 5:
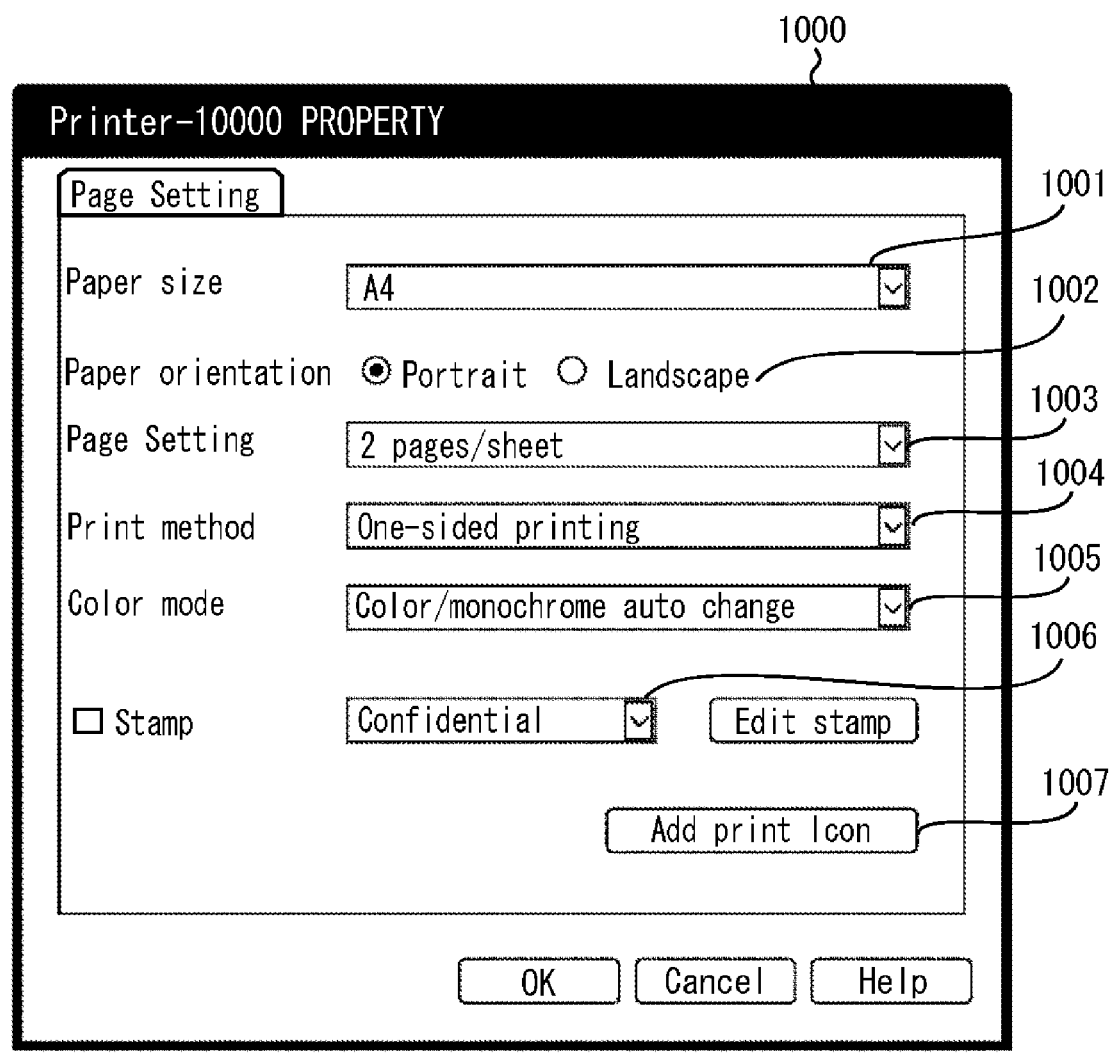
FIG. 5 illustrates a UI of the printer driver of the printing system according to the embodiment of the present invention.
Figure 6:
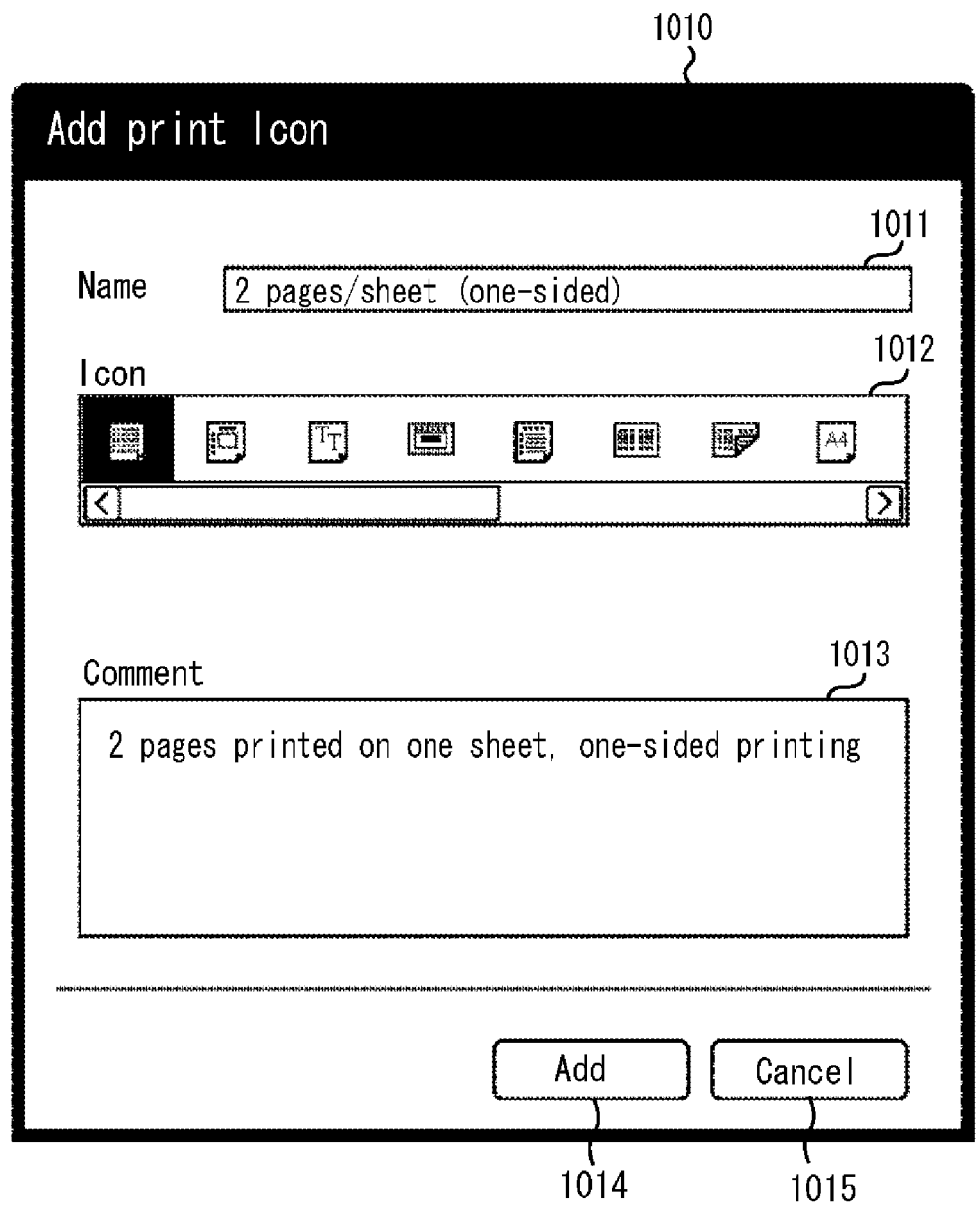
FIG. 6 is a UI for generating the duplicated printer icon which is associated with the specific print setting of the printing system according to the embodiment of the present invention.
Figure 8:
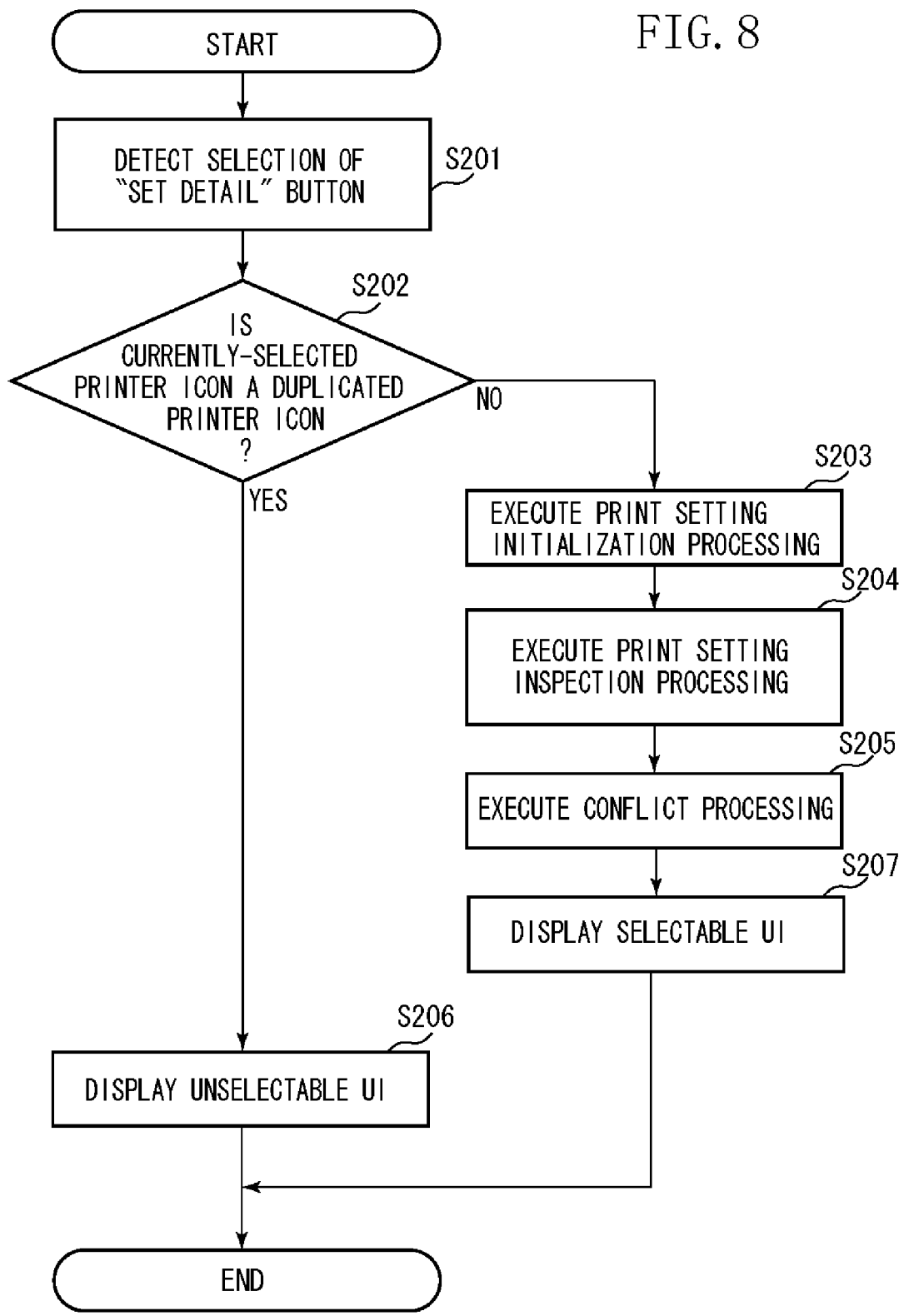
FIG. 8 is a flowchart illustrating processes when the UI of the duplicated printer icon of the printing system is displayed according to the embodiment of the present invention.

When the print common dialog illustrated in FIG. 7 is displayed and if the add button of the printer is selected, step S101 of the flowchart in FIG. 4 is started. When the processes of the flowchart in FIG. 4 are completed, then the print common dialog illustrated in FIG. 7 is displayed again. If the icon 1023 or one of the printer icons displayed in the field 1024 is selected, and further a print button 1028 is selected, a print setting that corresponds to the selected icon is set and printing will be started. If a set-detail button 1021 is selected, the processes in the flowchart illustrated in FIG. 8 is started. When the processes in FIG. 8 are completed, the screen illustrated in FIG. 7 is displayed again.

Next, procedures of operation that are performed when detailed information on the selected item is displayed using UI when the duplicated printer icon is selected according to the printing system of the present exemplary embodiment will be described referring to the operation flow illustrated in FIG. 8.

In step S201, the process starts when the printer driver detects that the set-detail button 1021 in the print common dialog 1020 is selected by the user. In step S202, when the user has selected the set-detail button 1021, the user interface unit 301 of the printer driver examines whether the currently-selected printer icon is a duplicated printer icon.

Figure 11:
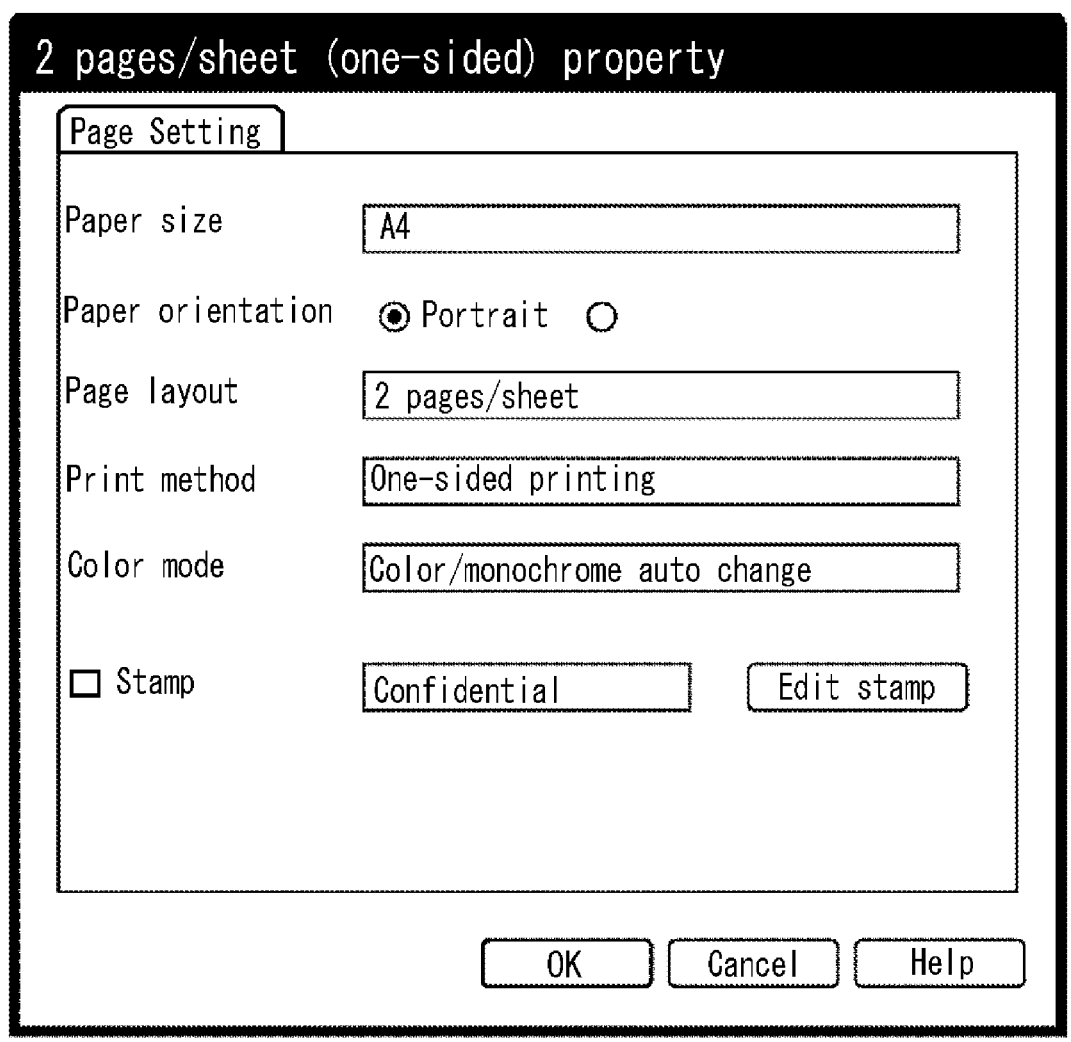
FIG. 11 illustrates an example of the UI of the printer driver when all the selection items of the printing system are invalidated according to the embodiment of the present invention.

If the printer icon is a duplicated printer icon (YES in step S202), then the process proceeds to step S206. In step S206, the user interface unit 301 displays the print setting items that cannot be selected. For example, the user interface unit 301 displays a screen illustrated in FIG. 11. The setting in FIG. 11 is a case where duplication of a printer icon "2 pages/sheet (one-sided)" in the print common dialog 1020 is selected. If such an unselectable setting is displayed, the user interface unit 301 ignores all the print settings which are received from the print instruction source, refers to the information included in the print setting information 510 that is stored and associated with the icon when the printer icon is generated, and displays the referred value.

In step S202, if the user interface unit 301 determines that the printer icon is not a duplicated printer icon (NO in step S202), then the process proceeds to step S203. The printer driver performs the print setting initialization processing in step S203, the print setting inspection processing in step S204, and the conflict processing in step S205. In step S207, the user interface unit 301 displays a UI 1000 which is selectable.

The application 200 may inquire the printer driver supported by the printer that performs normal printing about the printing capability of the printer before the printer performs the printing. For example, the application 200 may inquire about the type of paper that can be printed by the printer, whether the printer allows landscape as well as portrait orientation, and whether two-sided printing can be performed.

Figure 16:
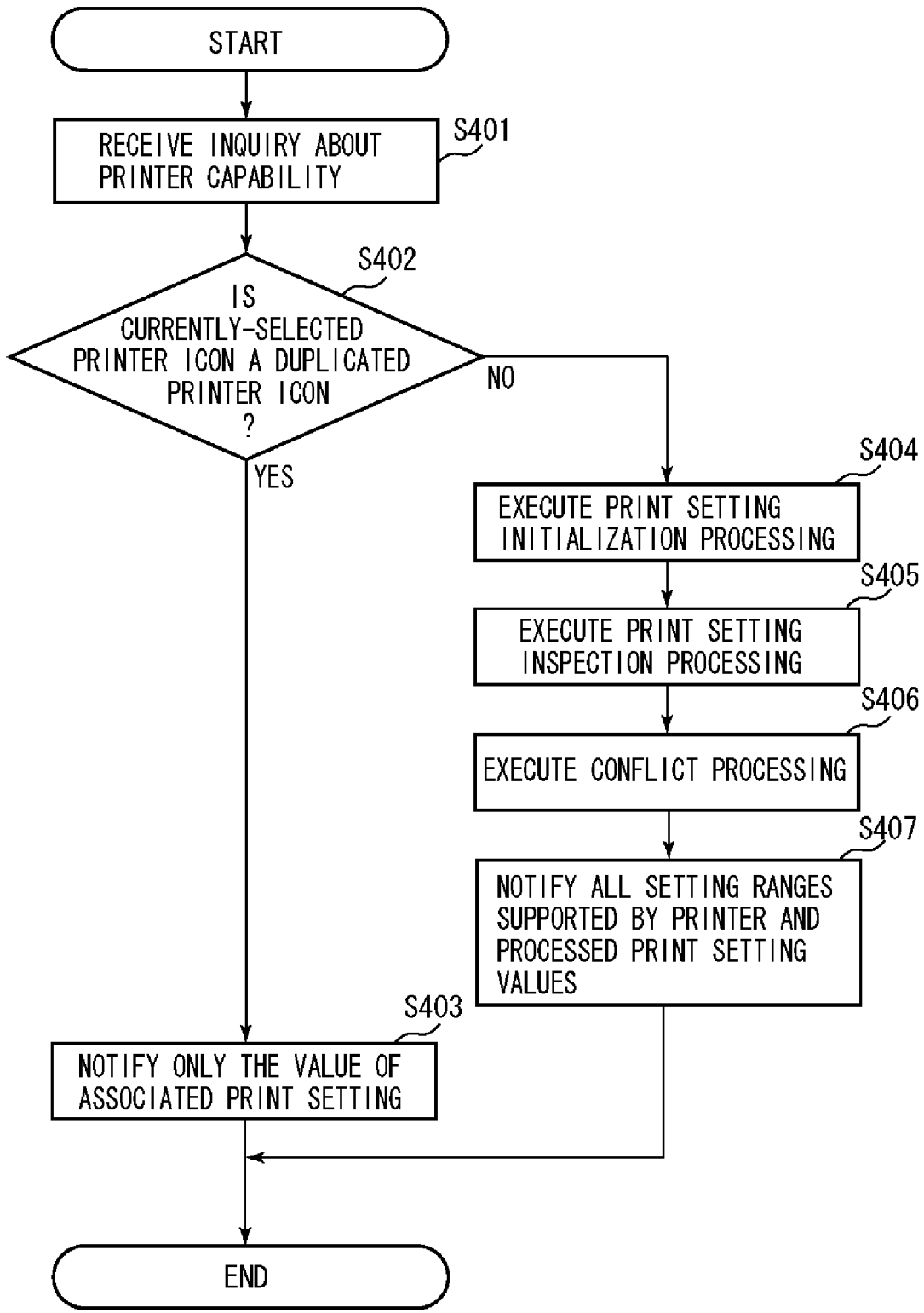
FIG. 16 illustrates a process flow regarding inquiry of printing ability of the printer of the printing system according to the embodiment of the present invention.

Processes that are performed when the above-described inquiry is made according to the printing system of the present embodiment will be described based on the flowchart illustrated in FIG. 16. The printer driver 202 starts a process when the above-described inquiry is received. In step S401, the printer driver 202 receives the inquiry. In step S402, the printer driver 202 examines whether the printer icon is a duplicated printer icon.

If the printer icon is not a duplicated printer icon (NO in step S402), then the process proceeds to step S404. In step S404, the printer driver 202 receives the entered print setting from the source of inquiry and executes the print setting initialization processing. In step S405, the printer driver 202 executes the print setting inspection processing. In step S406, the printer driver 202 executes the conflict processing. In step S407, the printer driver 202 notifies the result of the processing to the source of the inquiry. Further, the printer driver 202 notifies to the source of the inquiry the selectable ranges such as a type of paper that can be printed by the corresponding printer (e.g., A3, A4, A5, legal, or letter), paper orientation (portrait or landscape), and a printing method (two-sided printing or one-sided printing).

On the other hand, in step S402, if the printer icon is a duplicated printer icon (YES in step S402), then the process proceeds to step S403. In step S403, the printer driver 202 notifies to the source of the inquiry the print setting value of only the associated print setting. For example, the printer driver 202 notifies the source of the inquiry that only the A4 paper in portrait orientation can be printed by one-sided printing. In this way, the above-described processing regarding print setting can be skipped. Further, the application 200 will be able to print using a print setting that is closer to the print setting associated with the duplicated printer icon.

The conflict according to the present invention includes a case where bookbinding and two-sided printing cannot be set at the same time and also a case where two-sided printing and OHP sheet cannot be set at the same time. In recent years, printing apparatuses are sophisticated and there is a considerable number of setting combinations that cause such a conflict.

Figure 12:
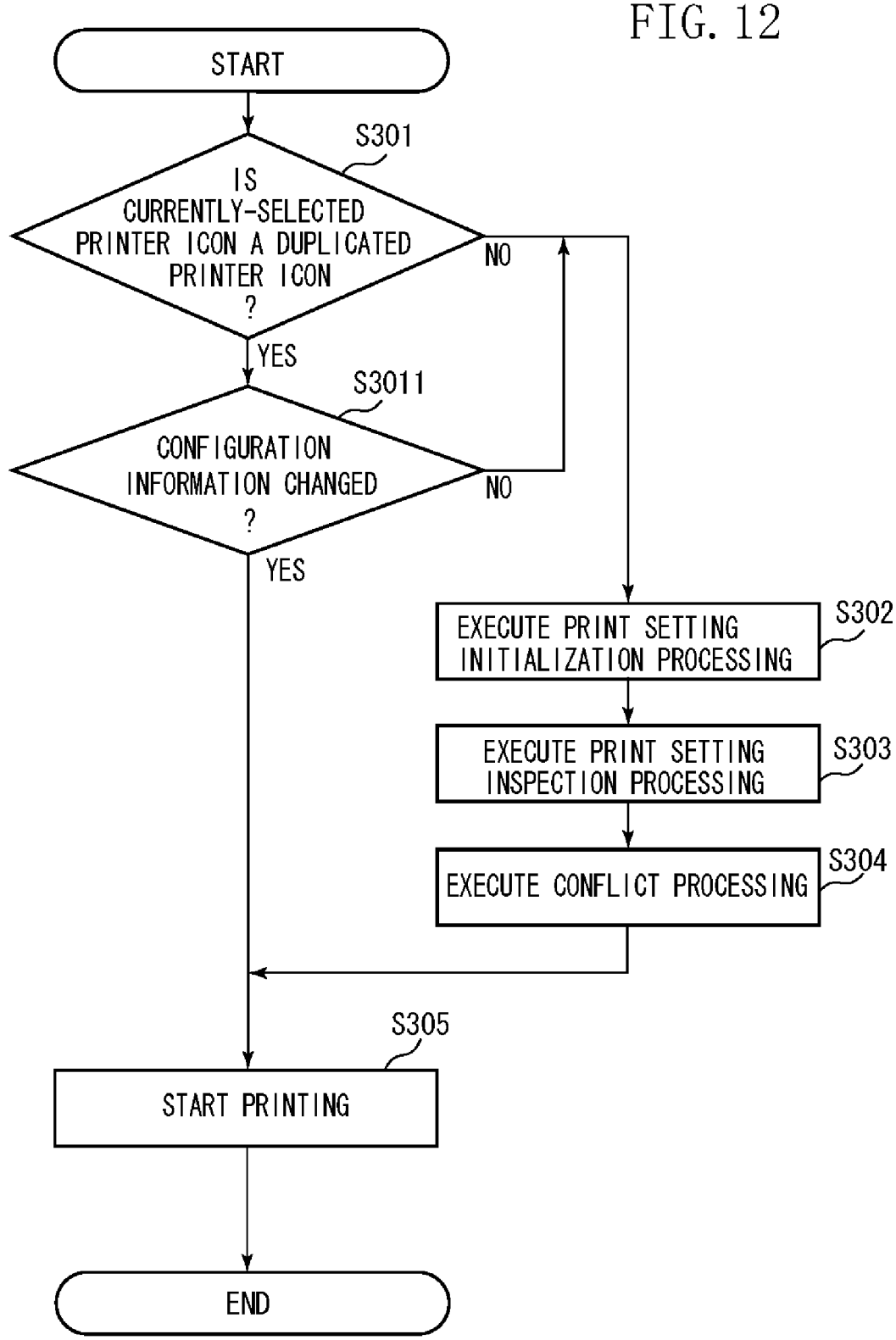
FIG. 12 illustrates a process flow of printing when the duplicated printer icon of the printing system is used according to the embodiment of the present invention.

Next, print operation which is performed when the duplicated printer icon is selected according to the printing system of the present embodiment will be described based on the flowchart illustrated in FIG. 12.

In step S301, the printer driver 202 examines the printer icon and determines whether it is a duplicated printer icon. If the printer icon is a duplicated printer icon (YES in step S301), then the process proceeds to step S3011. In step S3011, the printer driver 202 acquires configuration information from the printer and examines whether the configuration has been changed by comparing the acquired configuration information with the previously-acquired information. For example, whether a change has occurred in printer option (two-sided unit, paper feeding paper deck, sheet cassette, discharge function, or presence or absence of HDD) is examined in step S3011.

In step S3011, if the printer driver 202 determines that the configuration information has been changed (YES in step S3011), then the process proceeds to step S305. In step S305, the printing is executed using the print setting information 510. The print setting information 510 is stored and associated with the icon at the time the printer icon is generated. The print setting initialization processing (step S302), the print setting inspection processing (step S303), and conflict processing (step S304) executed by the normal printer driver is skipped. In step S3011, if the printer driver 202 determines that the configuration information has not been changed (NO in step S3011), then the process proceeds to step S302.

In step S301, if the printer icon is not a duplicated print icon (NO in step S301), then the process proceeds to step S302. The printer driver 202 executes the print setting initialization processing in step S302, the print setting inspection processing in step S303, and the conflict processing in step S304.

According to the above-described embodiment, the UI display of print setting and printing is fixed in the print setting information 510 that is associated with the duplicated printer icon. According to the present embodiment, print setting of the current document data can be changed and printed.

Figure 9:
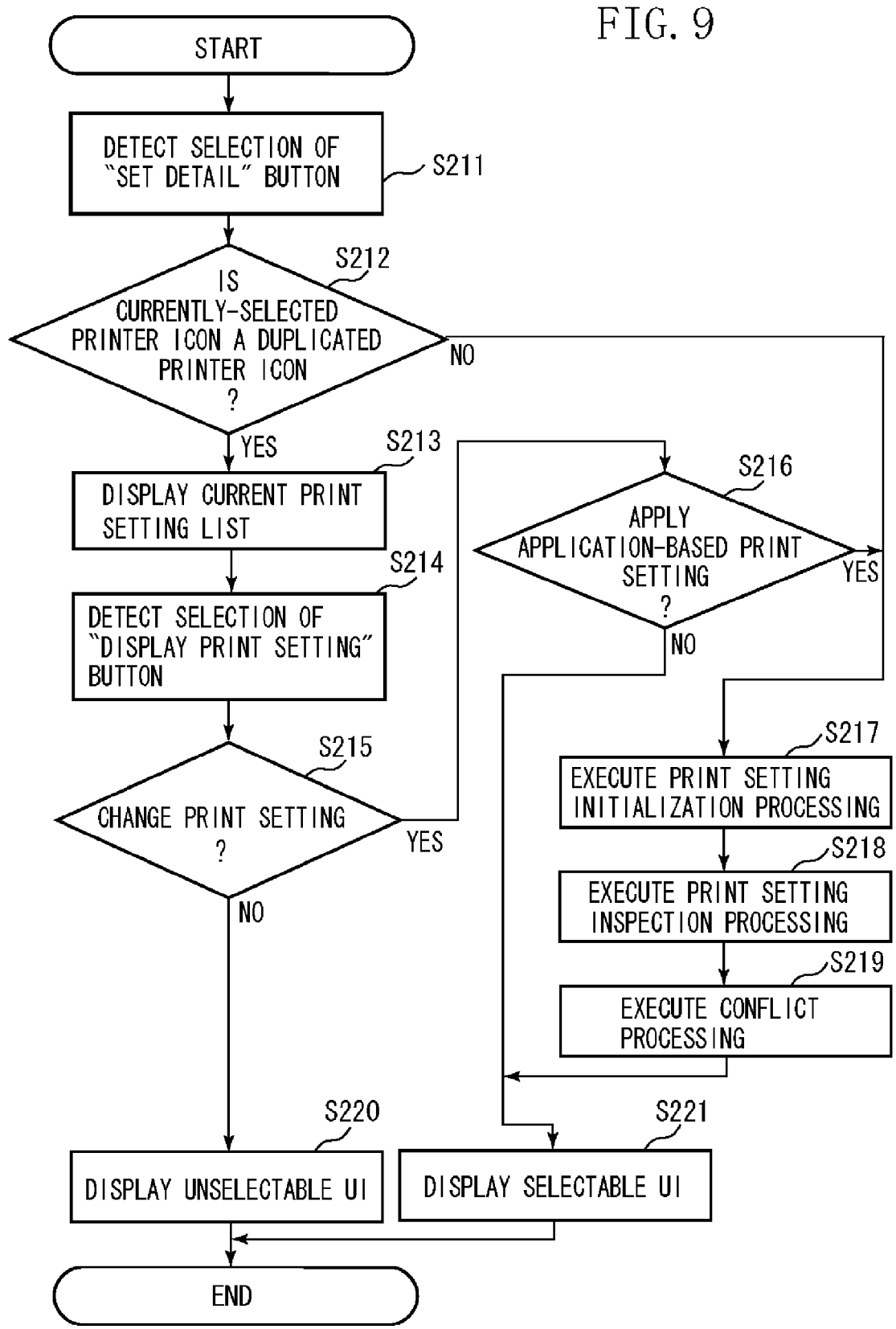
FIG. 9 is a flowchart illustrating processes when the UI of the duplicated printer icon of the printing system is displayed according to another embodiment of the present invention.

Now, procedures of operations according to the printing system of the present exemplary embodiment will be described referring to the operation flow illustrated in FIG. 9. In this case, the duplicated printer icon is selected and detailed information about the selected item is displayed using the UI Hereinafter, if not explicitly expressed, it is the printer driver 202 that performs each process.

In step S211, the process starts when the user interface unit 301 of the printer driver detects that the set-detail button 1021 of the print common dialog 1020 is selected by the user. Next, in step S212, the user interface unit 301 of the printer driver examines whether the currently-selected printer icon is a duplicated printer icon.

If the user interface unit 301 of the printer driver determines that the currently-selected printer icon is a duplicated print icon (YES in step S212), then the process proceeds to step S213. In step S213, the user interface unit 301 of the printer driver displays the print setting list screen on the CRT.

Figure 10:
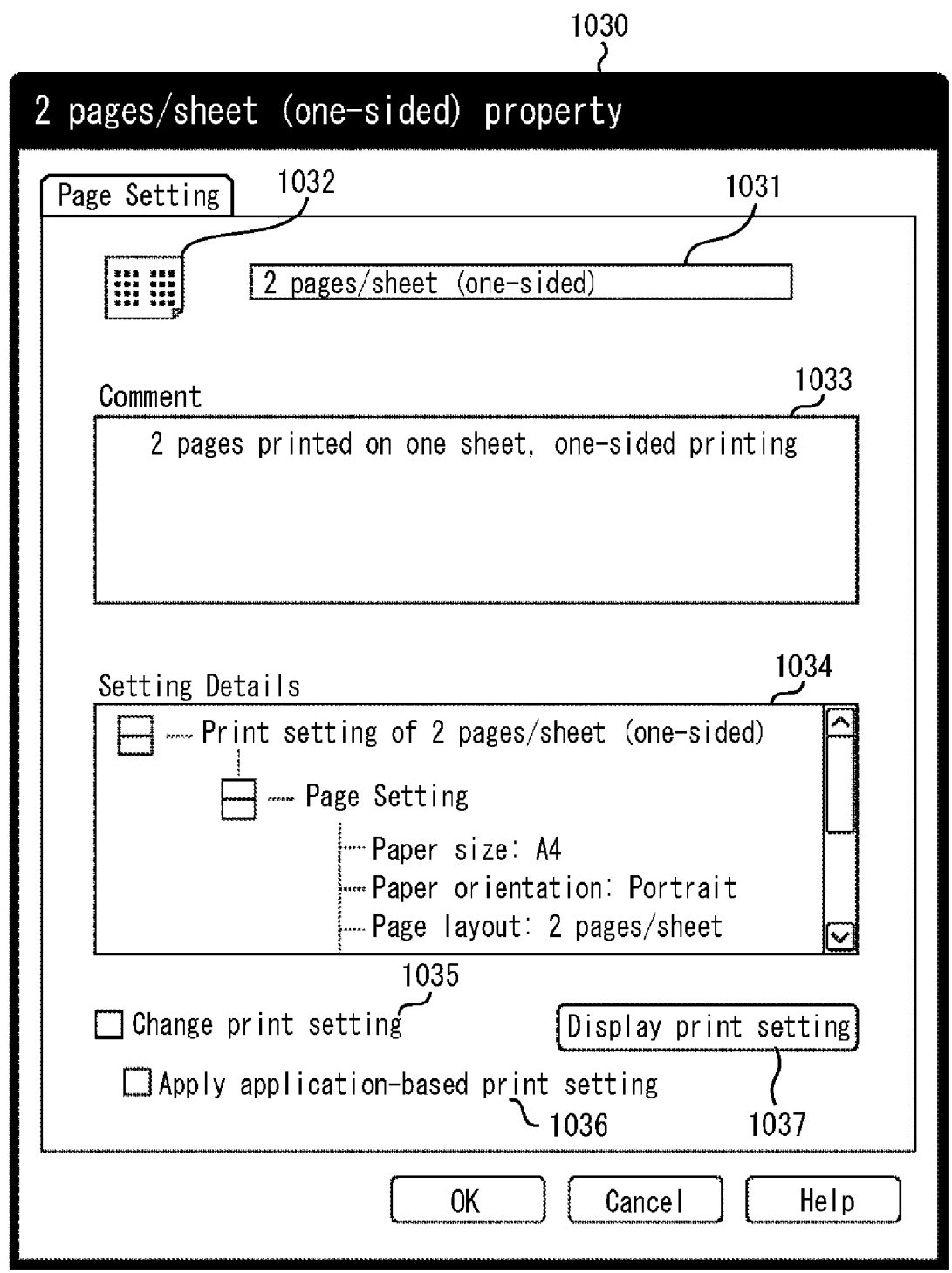
FIG. 10 illustrates an example of the UI displaying a list of print settings of the printer icons duplicated by the printing system according to the another embodiment of the present invention.

For example, the user interface unit 301 displays a screen 1030 illustrated in FIG. 10. The setting in FIG. 10 is a case where duplication of a printer icon "2 pages/sheet (one-sided)" in the print common dialog 1020 is selected. On this screen, the name entered in the name field 1011 is displayed in a field 1031, the icon selected from the icon field 1012 is displayed in a field 1032, and the comment entered in the comment field 1013 is displayed in a field 1034. The user interface unit 301 of the printer driver refers to the information in the print setting information 510 that is stored and associated with the icon when the printer icon is generated, and displays the referred value.

In step S214, when a button 1037 that displays the print setting is selected by the user, the process proceeds to step S215. In step S215, the printer driver examines whether a "change print setting" button 1035 that permits change in print setting set in the screen 1030 in FIG. 10 is selected. If the "change print setting" button 1035 button is not selected (NO in step S215), then in step S220, the printer driver displays a screen in which all setting items are unselectable as illustrated in FIG. 11.

Further, if the "change print setting" button 1035 button is selected (YES in step S215), then regardless of whether a "apply application-based print setting" button 1036 is selected, the user interface unit 301 displays selectable print settings. In step S216, if the application-based print setting is not applied (NO in step S216), then in step S221, the user interface unit 301 displays the associated information in the print setting information 510 as it is.

In step S212, if the printer icon is not a duplicated printer icon (NO in step S212), then the process proceeds to step S217. By using the print setting input from the application 200 and the print setting of the associated print setting information 510, the printer driver performs each processing regarding print setting, and the user interface unit 301 displays the obtained result. Such processing is the print setting initialization processing executed in step S217, the print setting inspection processing executed in step S218, and the conflict processing executed in step S219.

Figure 13:
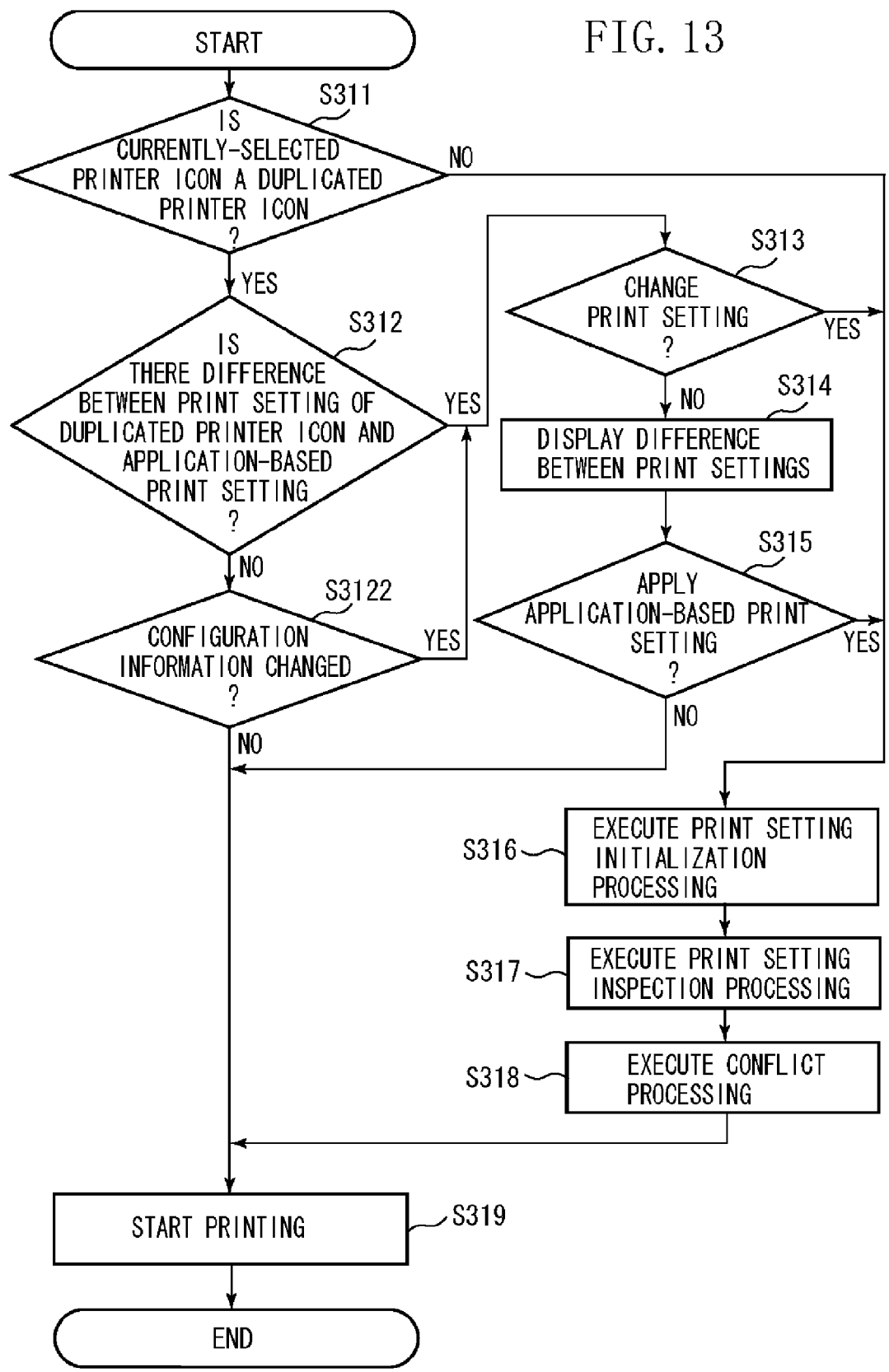
FIG. 13 illustrates a process flow of printing when the duplicated printer icon of the printing system is used according to another embodiment of the present invention.

Next, print operation which is performed when the duplicated printer icon is selected according to the printing system of the present embodiment will be described based on the flowchart illustrated in FIG. 13.

In step S311, the printer driver 202 determines whether the printer icon is a duplicated printer icon.

In step S311, if the print icon is a duplicated print icon (YES in step S311), the process proceeds to step S312. In step S312, the printer driver 202 examines whether a difference exists between the print setting information 510 associated with the duplicated print icon and the application-based print setting. If a difference exists (YES in step S312), then in step S313, the printer driver 202 examines whether the "change print setting" button 1035 that permits change in print setting set in the screen 1030 in FIG. 10 is selected.

Further, in step S312, if a difference does not exist (NO in step S312), then the process proceeds to step S3122. In step S3122, the printer driver 202 determines whether the printer configuration information is changed. If the configuration information is not changed (NO in step S3122), the process proceeds to step S319. Further, if the configuration information is changed (YES in step S3122), then the process proceeds to step S313.

Figure 14:
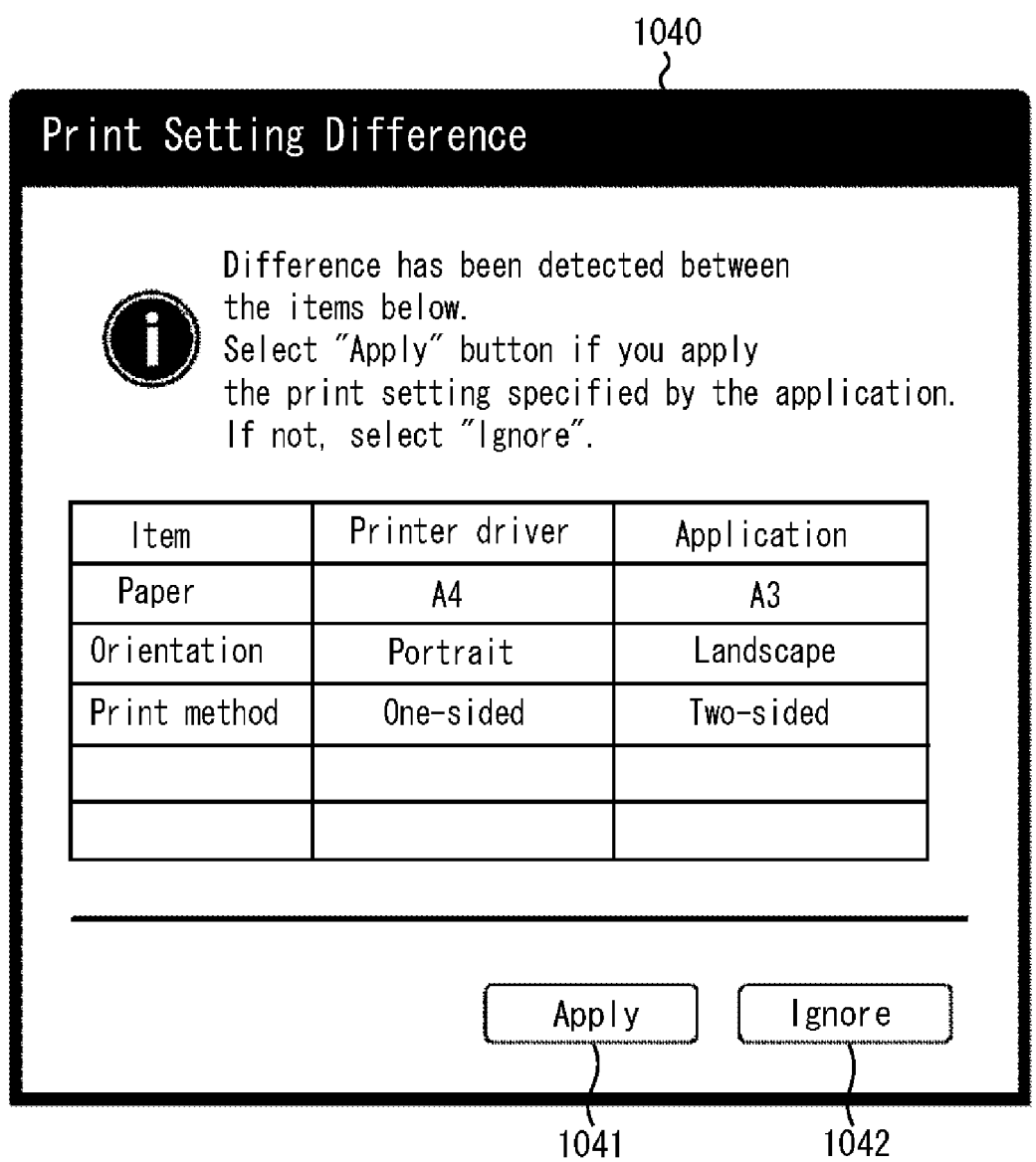
FIG. 14 illustrates an example of the UI that displays a difference between print settings at the time of printing according to the another embodiment of the present invention.

In step S313, if the printer driver 202 determines that the "change print setting" button 1035 is not selected (NO in step S313), then the process proceeds to step S314. In step S314, the user interface unit 301 displays the print items that have the difference in print setting. As an example of a screen that displays the difference, a screen such as a screen 1040 illustrated in FIG. 14 will be displayed. In step S315, the printer driver 202 determines whether to apply the application-based print setting. If the printer driver 202 determines that an ignore button 1042 on the screen is selected by the user (NO in step S315), then in step S319, printing is executed using the print setting information 510.

In step S311, if the printer driver 202 determines that the printer icon is not a duplicated icon (NO in step S311), or in step S313, if the printer driver 202 permits change in the print setting (YES in step S313), or further in step S315, if the application-based print setting is to be used (YES in step S315), then the following processing will be performed.

By using the print setting input from the application 200 and the print setting of the associated print setting information 510, the printer driver performs each processing regarding print setting, and the user interface unit 301 displays the obtained result. The processing described above is the print setting initialization processing executed in step S316, the print setting inspection processing executed in step S317, and the conflict processing executed in step S318.

According to the above-described exemplary embodiment, the duplicated printer icon is based on a single printer icon. However, a plurality of printer icons can also be used as base icons. In such a case, it is useful to state clearly from what printer icon the duplicated printer icon is copied. For example, it is useful if the name of the base print icon is added or the associated icon can be distinguished from others by using a different color.

A technical principle of the present embodiment will be described below. The duplicated printer icon includes appropriate conflict setting and evaluation setting. Thus, if the setting is based on a duplicated printer icon and the setting is not changed by the user or the application, then the conflict processing and the evaluation processing will be skipped. In this way, time for conflict resolution and evaluation processing, which is time-consuming, can be reduced.

As described above, the printer 150 is employed as an example of the printing apparatus.

The host computer 100, as an example of the information processing apparatus, transmits print data to the printer 150 so that the data can be printed.

Further, the printer driver 202 determines whether the complex print setting that includes a plurality of selected setting values needs conflict resolution of the setting values.

Further, as one example of complex setting, there is the "favorites" setting. If the printer driver 202 determines that the conflict resolution of the setting values of "favorites" is unnecessary, the conflict resolution processing of the setting values is not executed and the print setting is set by the CPU. If conflict resolution of the setting values of the favorites is determined as necessary by the printer driver 202, then the conflict resolution processing of the setting values will be executed and the print setting is set by the printer driver 202.

Further, the printer driver 202 may determine that the conflict resolution of the setting values is unnecessary if the complex setting is selected by a selection of a printer object.

If complex setting is selected by a selection of a duplicated printer object, and if the setting which is set using the selected complex setting is not changed by an application or a user, the printer driver 202 may determine that the conflict resolution of the setting values is not necessary.

The printer driver 202 may determine that the conflict resolution of the setting values is unnecessary if the complex setting is selected by the selection of duplicated printer object, and further, if the configuration change of the printing apparatus is not detected.

If the selected printer object is a duplication of a predetermined printer object, change in print setting using the setting screen of the computer 100 may be inhibited.

If the selected printer object is a predetermined printer object, the printer driver 202 may display a setting screen of the selected printer object.

If the selected printer object is a predetermined printer object, the printer driver 202 may notify only of specific setting values in response to an inquiry of a setting value that can be set.

If the selected printer object is a (duplicated) predetermined printer object, and if an instruction to change setting of the selected printer object is given by the application or by the user, whether the application-based setting or the setting input by the user is applied or the print setting corresponding to the above-described printer object is to be used for printing can be selected.

As described above, the setting values included in the favorites setting is defined using XML and time for resolving the conflict of the setting values described in XML can be reduced according to the present embodiment.

Functions illustrated in each of the figures according to the exemplary embodiments can be realized by the host computer 100 and the printer 150 using a program installed from an outside device. In this regard, the present invention can also be applied when an information group including a program is provided to the host computer from the storage medium such as a compact disc read-only memory (CD-ROM), a flash memory, a floppy disk, or an outside storage medium via a network.

As described above, a storage medium storing a software program code which realizes a function of the above-described embodiments is supplied to the control system or the information processing apparatus, or downloaded from an external server (not shown). Thus, the above-described embodiments can be also realized when a computer (or a CPU or a MPU) of the peripheral apparatus control system or the information processing apparatus, or the peripheral apparatus reads and executes the program code stored in such a storage medium.

In this case, the program code itself read out from the storage medium realizes the novel functions described in the above-described embodiments. Thus, the storage medium which stores the program code constitutes the above-described embodiments. As a storage medium which provides the program code, a floppy disk, a hard disk, an optical disk, a magneto-optical disk, a DVD, a CD-ROM, a magnetic tape, a non-volatile memory card, a ROM, or an EEPROM, etc. may be used.

A function of the above-described embodiments is realized not only when the computer executes the program code but also when an OS or the like, which runs on a computer, can execute a part or whole of the actual processing based on an instruction of the program code to realize a function of the above-described embodiments. Furthermore, the program code read out from the storage medium is written in a memory in a function expanding board inserted into a computer or a function expanding unit connected to the computer and a CPU provided in the function expanding board or the function expanding unit performs the whole or a part of the actual processing based on an instruction from the program to realize the functions of the above-described exemplary embodiments.

According to the present embodiment, the following effect can be obtained. By selecting a printer icon that corresponds to the purpose of the printing at the time of printing, the time for starting the UI of the printer driver can be eliminated and reliability of the print setting associated with the printer icon can be increased as the print setting is fixed.

The print setting that has undergone the inspection processing and the conflict processing and has been stored, is used as the print setting that is associated with the duplicated printer icon. In using such a print setting, the inspection and the conflict processing at the time the print setting is used, for example, at the time of UI display and or printing, becomes unnecessary. Thus, processing time can be reduced and performance can be improved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-162313 filed Jun. 20, 2008, which is hereby incorporated by reference herein in its entirety.

What is claimed is:

1. An information processing apparatus configured to transmit print data to a printing apparatus to perform printing, the information processing apparatus comprising:

a display unit configured to control display of a screen including a plurality of printer objects for designating a printing apparatus as a print common dialog that is started in response to a print instruction given from an application;

an addition unit configured to register, by using a function of a system spooler, a duplicated printer object duplicated from one of the plurality of printer objects corresponding to a printer driver installed in the information processing apparatus as a first printer object corresponding to a complex print setting including a plurality of setting values;

an inhibition unit configured to inhibit a change in a print setting using a setting screen of the printer driver corresponding to the first printer object when the first printer object is selected from the plurality of printer objects included in the print common dialog;

a determination unit configured to determine that a conflict resolution of the setting values included in the complex print setting is not required according to the inhibition of the change in the print setting by the inhibition unit when the first printer object is selected from the plurality of printer objects included in the print common dialog and an execution unit configured to execute print processing using the setting values included in the complex print setting without performing the conflict resolution, if the determination unit determines that the conflict resolution is not required according to the selection of the first printer object, wherein the determination unit determines that the conflict resolution of setting values is required when the second printer object which is different from the first printer object is selected from the plurality of printer objects included in the print common dialog, and wherein the execution unit executes print processing using setting values that have undergone the conflict resolution, if the determination unit determines that the conflict resolution is required according to the selection of the second printer object.

2. The information processing apparatus according to claim 1, wherein the setting values included in the complex print setting are defined based on XML and the addition unit registers the first printer object corresponding to the complex print setting for reducing processing time for conflict resolution of the setting values described in XML.

3. A control method for an information processing apparatus configured to transmit print data to a printing apparatus to perform printing, the method comprising:

controlling a display of a screen including a plurality of printer objects for designating a printing apparatus as a print common dialog that is started in response to a print instruction given from an application;

registering, by using a function of a system spooler, a duplicated printer object duplicated from one of the plurality of printer objects corresponding to a printer driver installed in the information processing apparatus as a first printer object corresponding to a complex print setting including a plurality of setting values;

inhibiting a change in a print setting using a setting screen of the printer driver corresponding to the first printer object when the first printer object is selected from the plurality of printer objects included in the print common dialog;

determining that a conflict resolution of the setting values included in the complex print setting is not required according to the inhibition of the change in the print setting when the first printer object is selected from the plurality of printer objects included in the print common dialog, and executing print processing using the setting values included in the complex print setting without performing the conflict resolution, if it is determined that the conflict resolution is not required according to the selection of the first printer object and, wherein determining that the conflict resolution of setting values is required when the second printer object which is different from the first printer object is selected from the plurality of printer objects included in the print common dialog, and executing print processing, if it is determined that the conflict resolution is required according to the selection of the second printer object, by using setting values that have undergone the conflict resolution.

4. The information processing method according to claim 3, wherein the setting values included in the complex print setting are defined based on XML and registering the first printer object corresponding to the complex print setting for reducing processing time for conflict resolution of the setting values described in XML.

5. A non-transitory computer readable storage medium storing a control program causing a computer to execute a control method for an information processing apparatus configured to transmit print data to a printing apparatus to perform printing, the control method comprising:

controlling a display of a screen including a plurality of printer objects for designating a printing apparatus as a print common dialog that is started in response to a print instruction given from an application;

registering, by using a function of a system spooler, a duplicated printer object duplicated from one of the plurality of printer objects corresponding to a printer driver installed in the information processing apparatus as a first printer object corresponding to a complex print setting including a plurality of setting values;

inhibiting a change in a print setting using a setting screen of the printer driver corresponding to the first printer object when the first printer object is selected from the plurality of printer objects included in the print common dialog;

determining that a conflict resolution of the setting values included in the complex print setting is not required according to the inhibition of the change in the print setting when the first printer object is selected from the plurality of printer objects included in the print common dialog, and executing print processing using the setting values included in the complex print setting without performing the conflict resolution, if it is determined that the conflict resolution is not required according to the selection of the first printer object, wherein determining that the conflict resolution of setting values is required when the second printer object which is different from the first printer object is selected from the plurality of printer objects included in the print common dialog, and executing print processing using setting values that have undergone the conflict resolution of the setting values, if it is determined that the conflict resolution is required according to the selection of the second printer object.

* * * * *